A. Rank.

Harvester.

No 3155 Reissued Oct. 6, 1868

Witnesses.
R. H. Campbell
Edw. Schafer

Inventor
Amos Rank
by
Mason, Fenwick & Lawrence

United States Patent Office.

AMOS RANK, OF SALEM, OHIO.

*Letters Patent No.* 70,614, *dated November* 5, 1867; *reissue No.* 3,155, *dated October* 6, 1868.

IMPROVEMENT IN HARVESTERS.

The Schedule referred to in these Letters Patent and making part of the same.

TO ALL WHOM IT MAY CONCERN:

Be it known that I, AMOS RANK, of Salem, in the county of Columbiana, and State of Ohio, have invented certain new and useful Improvements in Harvesters, of which the following is a full, clear, and exact description.

My invention relates to that class of harvesters in which the gavel is dropped directly behind the cutting apparatus by a vertically-oscillating platform, and the object of the invention, herein claimed, is to remove the cut grain, after it has been deposited upon the ground, out of the path of the team in cutting the succeeding swath, by an automatic device, operated by the machine itself.

The invention herein claimed consists:

First, in a novel method of combining a vibrating platform to support the falling grain, with a scraper or deflector, which removes the gavel out of the way of the team in cutting the next swath.

Second, in a novel method of combining, in a harvester, a vibrating platform, composed of slats supported at one end only, with a deflector or scraper to clear the track for the next round.

Third, in a novel method of combining a vibrating platform connected with the main frame through the medium of the finger-bar only, with a scraper extending across the entire swath.

Fourth, in a novel method of combining a finger-beam, and a flexible scraper hinged to the finger-beam at its front end, and having its rear end attached to the main frame by a flexible connection.

In the accompanying drawings, I have shown one practical mode of carrying out the objects of my invention, but I do not desire to confine myself to the precise form and mode of attachment of the scraper, nor to the precise construction of the rear-delivery dropping-attachment.

In the drawings—

The finger-beam, A, is suspended from the main frame by linked or pivoted connections in the usual way, and provided with a divider, B.

Figure 2:
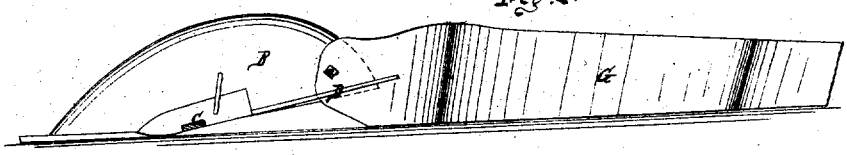
Figure 2 represents a view, in elevation, of the parts shown in fig. 1, as seen from the grain side of the machine.

The platform is composed of a series of parallel slats or rods, D, secured at their forward ends to a rock-shaft or bar, C, which extends along the rear edge of the finger-beam, and is pivoted at its ends, so as to oscillate freely in a vertical plane. Provision is made for enabling the attendant to raise the rear end of said platform, as shown in fig. 2, and to keep it in the position free from the stubble during the operation of cutting a sufficient quantity of grain to form a gavel, and also for allowing the attendant to drop the platform upon the ground, so as to cause the stubble to drag off the gavel.

Where these droppers have been used, a fender or divider is arranged over the finger-beam, so as to rise when the platform drops, for the purpose of preventing the cut grain from falling upon it.

A plate or board, G, is hinged to the divider B, by a pivot, *a*, which allows it to play vertically, to conform to the movements of the cutting-apparatus and to undulations of the surface of the ground.

Figure 1:
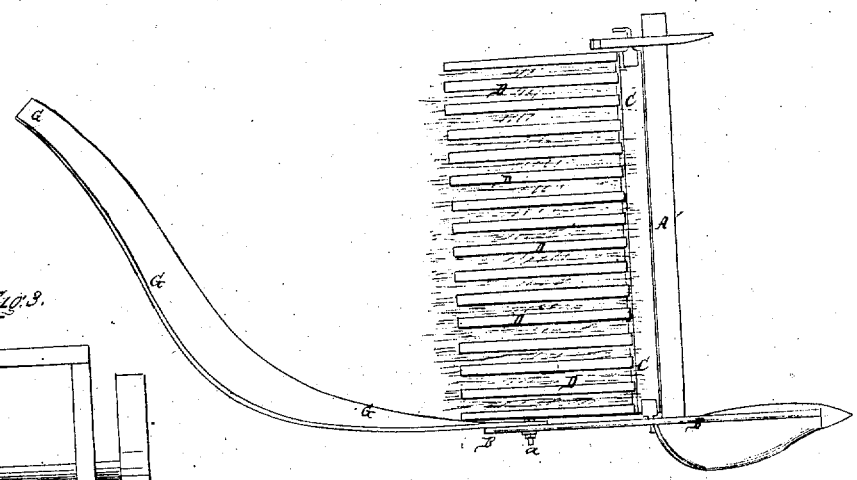
Figure 1 represents a plan or top view of so much of a harvester as is necessary to illustrate the adaptation of my invention to a slatted dropper.
Figure 3:
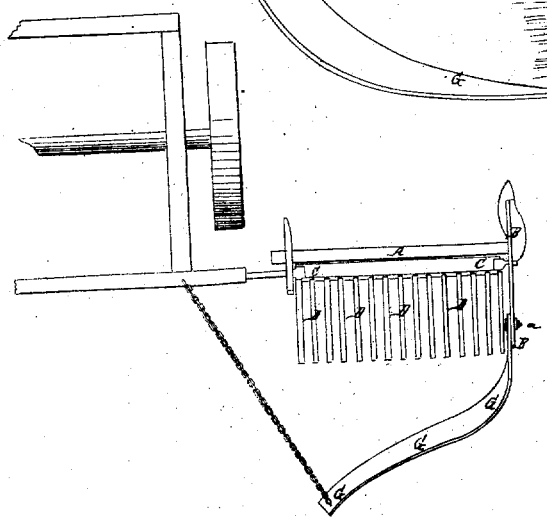
Figure 3 represents a plan or top view of a portion of a two-wheeled hinged-joint harvester, showing the manner in which the cutting-apparatus, platform, and scraper are attached to the main frame.

This board curves backward from the divider to the gearing side of the swath, as shown in fig. 1, and thus forms a scraper, to remove the gavel discharged from the platform out of the way of the team in cutting the next swath.

This scraper is, by preference, composed of metal, and connected with the main frame by a chain attached to its rear end, which chain braces the scraper against lateral strains, but leaves it free to play vertically.

In operation, the platform is kept elevated, as shown in fig. 2, until sufficient grain has been cut to form a gavel. The platform is then tilted to discharge the gavel, which is swept to one side by the scraper. As the platform tilts, a cut-off of any well-known form is interposed between the platform and the falling grain, to keep it from falling upon the platform, and being dragged off by the stubble, and swept aside by the scraper in a straggling swath, instead of in gavels.

I am aware that a track-clearer has been used in combination with a revolving reel-platform arranged some distance behind a finger-beam, and dropping the gavel by its revolution, but such a platform differs, in many respects, from mine.

What I claim, is—

1. The combination, substantially as set forth, of a vibrating platform, with a scraper, hinged to the outer divider, which removes the discharged gavel out of the way of the team in cutting the succeeding swath.

2. The combination of a vibrating platform, composed of slats, supported at one end only, with a scraper, hinged to the outer divider, which clears the track for the next round.

3. The combination of a vibrating platform, connected with the main frame, through the medium of the finger-beam only, with a scraper, hinged to the outer divider, which removes the discharged gavel out of the way of the team in cutting the succeeding swath.

4. The combination of a finger-beam, with a flexible track-clearer or scraper, having its forward end hinged to the finger-beam, and its rear end suspended by a flexible connection from the main frame.

AMOS RANK.

Witnesses:

E. H. LEYMAN,

THOS. S. BAIRD.